United States Patent
Klemm

(10) Patent No.: US 8,290,132 B2
(45) Date of Patent: Oct. 16, 2012

(54) COMMUNICATIONS HISTORY LOG SYSTEM

(75) Inventor: Reinhard Peter Klemm, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 533 days.

(21) Appl. No.: 12/545,715

(22) Filed: Aug. 21, 2009

(65) Prior Publication Data

US 2011/0044431 A1 Feb. 24, 2011

(51) Int. Cl.
*H04M 1/56* (2006.01)
*H04M 15/06* (2006.01)
*H04M 3/42* (2006.01)

(52) U.S. Cl. ............. 379/142.1; 379/142.01; 379/201.1

(58) Field of Classification Search ............. 379/142.06, 379/142.1, 142.11, 201.1; 455/415
See application file for complete search history.

(56) References Cited

U.S. PATENT DOCUMENTS

| | | | |
|---|---|---|---|
| 7,664,249 B2 * | 2/2010 | Horvitz et al. | 379/221.05 |
| 2003/0063732 A1 * | 4/2003 | Mcknight | 379/210.01 |
| 2003/0148753 A1 * | 8/2003 | Pappalardo et al. | 455/405 |
| 2006/0002536 A1 * | 1/2006 | Ambrose | 379/201.01 |
| 2008/0075251 A1 * | 3/2008 | Jefferson et al. | 379/142.07 |

OTHER PUBLICATIONS

Abu-Hakima, Sue, "Intelligent Agents for Seamless Personal Information Networking", "AAAI Technical Report WS-00-03—AiDIN99 Working Notes", Jul. 1999, Publisher: AAAI.
"A Survey of Intelligent Agents in Telecommunications", "https://www.cs.tcd.ie/research_groups/aig/iag/survey.html", Jul. 3, 2009.

* cited by examiner

*Primary Examiner* — Quoc D Tran

(57) ABSTRACT

A method is provided in which information about one or more telecommunications session characteristics is stored in a communications history log. A prediction is then made for the occurrence of telecommunications session characteristic in the future on the basis of the information stored in the communications history log.

19 Claims, 9 Drawing Sheets

Figure 6

Graphical Interface for the Input of Telecommunications Sessions Characteristics by a User — 610

Enter the Dispostion of the Far End Party

○ Friendly

○ Hostile

○ Indifferent

Enter the Future Availability of the Far End Party

○ Mornings

○ Afternoons

○ Nights

Enter the Availability of the Far End Party

○ Available

○ Not Available

○ Available in Emergency Only

COMMUNICATIONS HISTORY LOG SYSTEM

FIELD OF THE INVENTION

The present invention relates to telecommunications in general, and, more particularly, to detection of status information.

BACKGROUND OF THE INVENTION

When a user initiates a telephone call or another type of telecommunications session with a far-end party, the user often does so without knowing whether the far-end party will be in a friendly mood when he or she answers the phone. However, if the user has access to information about the far-end party's mood, the user can plan accordingly and make the call when the far-end party is likely to be friendly. In a similar fashion, if the user has information about the availability of the far-end party, the user can select a time for the telephone call in which the far-end party is most likely to answer the phone.

Indications of availability and mood are often provided by telephony and instant messaging applications, such as Skype™. These applications use centralized presence servers to provide the availability and mood information. In general, the presence servers store status information about network users which has been submitted by the users themselves. And also, the presence servers distribute the status information for any particular user to the other users in the network. Thus, in order for a network user to obtain status information about another user, the first user has to connect to a presence server and obtain the information from there.

This approach, however, suffers from several disadvantages. First, the maintenance of presence servers is costly. Second, the information stored by the presence servers is not reliable because people often do not update their status as it changes. For instance, if the availability of a doctor changes frequently during the course of a busy day, the doctor is unlikely to connect to the presence server and update his or her status every time the doctor frees up and has half-an-hour to talk on the phone.

Third, the information posted on a presence server by a person is not an objective assessment of the person's true status. When users provide presence, availability, disposition and other types of information about themselves, this information reflects their own subjective view of these characteristics. For example, a person may submit to a presence server an indication that he or she is available to participate in telecommunications sessions, in a good mood, and with a high energy level. However, when a caller calls the person, the caller may find that the person has only a few minutes to talk, seems grumpy, and yawns frequently, thus exhibiting low energy levels. Put simply, because it is not an objective assessment of the person's status, the information posted on the presence server can be misleading.

For these reasons, the need exists for an improved method for detection of status information about users in telecommunications networks.

SUMMARY OF THE INVENTION

The present invention addresses this need. In the present invention, information about one or more telecommunications session characteristics is stored in a communications history log. A prediction is then made for the occurrence of a telecommunications session characteristic in the future on the basis of the information stored in the communications history log.

A "telecommunications session characteristic" is an item of information about a telecommunications session or a party involved in the telecommunications session. Examples of telecommunications session characteristics are the availability of a person to participate in a telecommunications session, time and date in which a telecommunications session took place, duration, preference by a person for using a specific communications channel (e.g. email, telephone, etc.), and others.

With respect to predicting availability, some embodiments of the present invention store availability information in a communications history log, determine patterns of the past availability of a far-end party, and based on these patterns predict the future availability of the far-end party. For example, and without limitation, when a user wants to connect to a customer service call center and speak to a live agent, the user has to call during the call center's business hours. If the user contacts the call center at 10:30 p.m. on Monday, the call center might be closed. In such case, either no one will answer the call or the user will hear a message advertising the call center's correct hours of operation. In accordance with this embodiment of the present invention, when either of these scenarios takes place, the telecommunications terminal used by the user will record an entry into a communications history log which indicates that the call center was not available at 10:30 p.m. on Monday.

On the next day, if the user again attempts to call the call center at night, the telecommunications terminal will consult the communications history log to determine the past availability of the call center. The terminal, then, will alert the user that the call center is likely not available to service clients at this time. The rationale for issuing the alert is that if the call center was called on Monday night, then the call center is likely closed on Tuesday night as well (assuming that the call center has uniform hours of operation during the week).

Other embodiments of the present invention involve the making of predictions of other telecommunications session characteristics, such as, for example, far-end party disposition. One illustrative embodiment of the present invention keeps track of whether a far-end party is friendly or unfriendly towards a caller and predicts the far-end party's disposition in future calls. This embodiments is particularly useful in the call center context, as it allows customer service representatives or telemarketers to be prepared about the disposition of the person whom they are about to speak with. Furthermore, the illustrative embodiment allows the call center representatives to select a time for a telephone call at which the far-end party is the least likely to be confrontational.

The following disclosure teaches examples of several illustrative embodiments and their operation.

BRIEF DESCRIPTION OF THE DRAWINGS

FIG. 6 depicts a schematic diagram for the salient components of the illustrative embodiment of the present invention.

DETAILED DESCRIPTION

Figure 1:
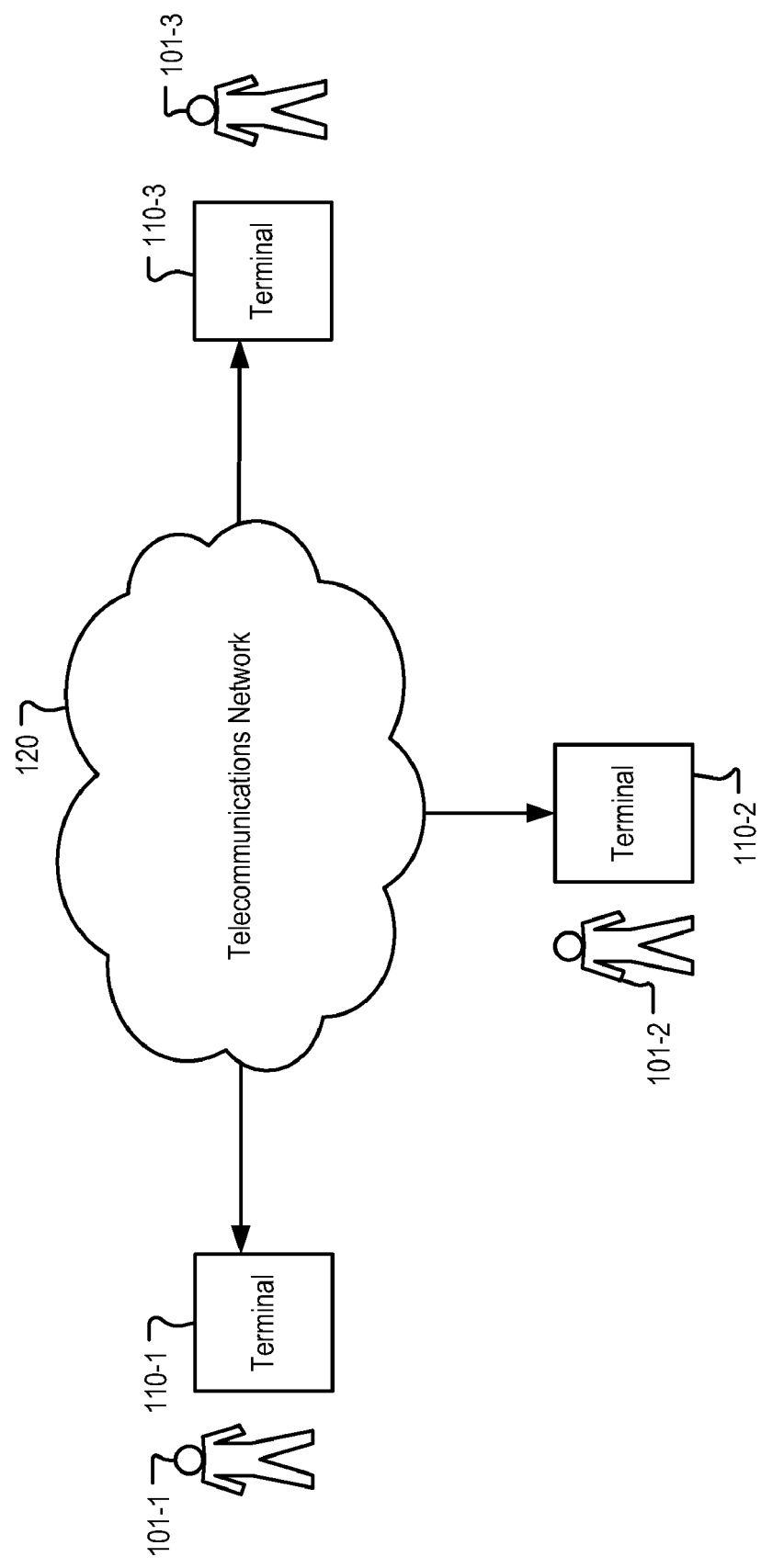
FIG. 1 depicts a schematic diagram of the salient components of the illustrative embodiment of the present invention.

FIG. 1 depicts a schematic diagram of the salient components of the illustrative embodiment of the present invention. The illustrative embodiment of the present invention comprises, user 101-$i$ wherein $i \in \{1, 2, 3\}$, terminal 101-$i$, and network 120.

User 101-$i$ is a natural person using terminal 101-$i$.

Terminal 110-$i$ is a telecommunications device which allows users 101-1, 101-2, and 101-2 to exchange telecommunications. Terminal 110-$i$ comprises a central processing unit (CPU) for executing commands and memory for storing the commands. In accordance with the illustrative embodiment of the present invention, terminal 101-$i$ is a general purpose computer executing telephony software, but it will be clear to those skilled in the art, after reading this disclosure, how to make and use alternative embodiments of the present invention in which terminal 101-$i$ is any type of telecommunications terminal, such as, for example, and without limitation, cellular telephone, desk set telephone receiver, personal digital assistant (PDA), etc.

Network 120 is a telecommunications network capable of carrying signals between terminals 110-1, 110-2, and 110-3. In accordance with the illustrative embodiment of the present invention, network 120 is the Internet, but it will be clear to those skilled in the art, after reading this disclosure, how to make and use alternative embodiments of the present invention in which network 120 is any other type of telecommunications network, such as, for example, and without limitation, the Public Switched Telephone Network (PSTN), cellular network, Synchronous Optical Networking (SONET) network, Asynchronous Transfer Mode (ATM) network, local area network (LAN), and others.

Figure 2:
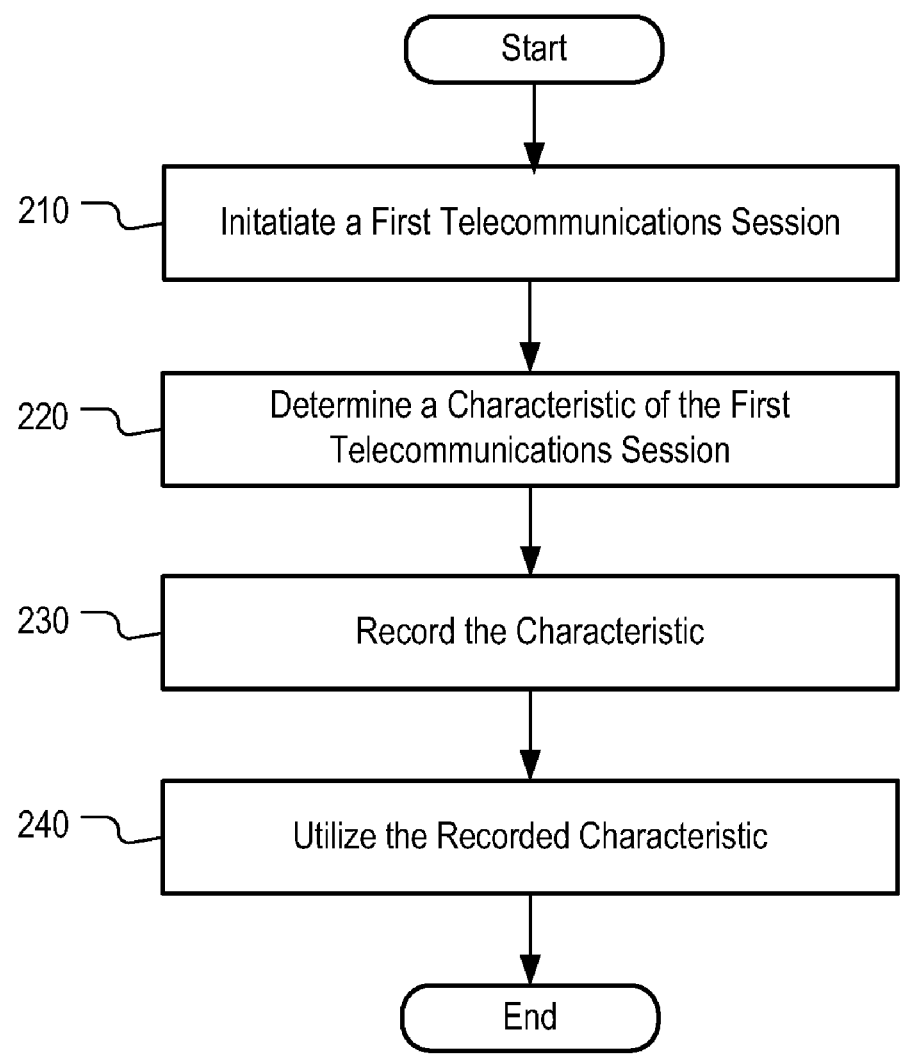
FIG. 2 depicts a flowchart of the execution of the salient tasks associated with the operation of the illustrative embodiment of the present invention.

FIG. 2 depicts a flowchart of the execution of the salient tasks associated with the operation of the illustrative embodiment of the present invention. It will be clear to those skilled in the art, after reading this disclosure, how to perform the tasks associated with FIG. 2 in a different order than represented or to perform one or more of the tasks concurrently. Furthermore, it will be clear to those skilled in the art, after reading this disclosure, how to make and use alternative embodiments of the present invention that omit one or more of the tasks.

At task 210, user 101-1 initiates a telecommunications session with user 101-2. The two users use terminals 110-1 and 110-2, respectively, for the conduct of the telecommunications session. In accordance with the illustrative embodiment of the present invention, the telecommunications session is a telephone call, but it will be clear to those skilled in the art, after reading this disclosure, how to make and use alternative embodiments of the present invention in which the telecommunications session is of any other type, such as, for example, and without limitation, e-mail, short message service (SMS), video call, Internet chat, instant messaging, and others. Furthermore, it will be clear to those skilled in the art, after reading this disclosure, how to make and use alternative embodiments of the present invention in which the telecommunications session is a transaction, such as, for example, and without limitation, an Internet purchase session, an interactive voice response (IVR) session, and so forth. Although, the telecommunications session is between two parties, it will be clear to those skilled in the art, after reading this disclosure, how to make and use alternative embodiments of the present invention in which a larger number of parties participate in the telecommunications session (e.g. two, three, ten, twenty, one hundred, five hundred, etc.).

At task 220 terminal 110-1 determines a characteristic of the telecommunications session. In accordance with the illustrative embodiment of the present invention, the characteristic determined is the duration of the telecommunications session, but it will be clear to those skilled in the art, after reading this disclosure, how to make and use alternative embodiments of the present invention in which any other telecommunications session characteristics is determined, such as, for example, and without limitation, physical attributes, document identifiers, availability, disposition, topic, as well as other types of characteristics.

Physical attributes are telecommunications session characteristics that are independent of the content of the information exchanged during the telecommunications session. The duration of the telecommunications session, which is measured in the illustrative embodiment of the present invention, is an example a physical attribute. However, it will be clear to those skilled in the art, after reading this disclosure, how to make and use alternative embodiments of the present invention in which other physical attributes are measured, such as, for example, and without limitation, time when a telecommunications session was started or finished, information about the strength of the signal received by user 101-1, the geographic location of the telecommunications terminal used by one or more participants in a telecommunications session, an information whether the far-end party answered an invitation to participate in the telecommunications session (e.g. whether user 110-2 answered the telephone call, etc.), the loss of signal from the far-end party (e.g. the dropping of incoming packages by network 120, etc. ), the level (loudness) of voice of the far-end party, geographic location, presence of background noise, echo return loss (ERL) of far-end signal, echo return loss enhancement (ERLE) of far-end signal, and others.

Availability is a telecommunications session characteristic that indicates the willingness (or ability) of a far-end party to participate in a telecommunications session. It will be clear to those skilled in the art, after reading this disclosure, how to make and use alternative embodiments of the present invention which determine availability with respect to specific communication media (e.g. voice, text, video, etc.) or specific topics of conversation (e.g. willingness of a user to discuss a first topic and unwillingness to discuss a second topic, etc.)

Disposition is a telecommunications session characteristic which reflects the posture of a far-end participant in a telecommunications session towards the near-end participant and/or towards the subject matter discussed during the telecommunications session. It will be clear to those skilled in the art, after reading this disclosure, how to make and use alternative embodiments of the present invention in which specific types of disposition are determined, such as, for example, and without limitation, the attitude of a far-end party towards a proposal made by the near-end party in the course of a telecommunications session (e.g. agreeable, disagreeable, extremely disagreeable, etc.), the attitude of the far-end party towards the near-end party (e.g. friendly, unfriendly, hostile, indifferent, etc.), the mood of a far-end party (e.g. happy, angry, edgy, grumpy, etc.), energy level of a far-end party (e.g. tired, energetic, lively, etc.), and others.

Topic is a telecommunications session characteristic which indicates the general subject matter of discussion between the participants in the telecommunications session. However, it will be clear to those skilled in the art, after reading this disclosure, how to make and use alternative embodiments of the present invention in which the topic characteristic includes specific items of information that were divulged during a communications session (e.g. the far-end-party admitted that he was a resident of New York in 2008, etc.).

A document identifier is an alphanumeric string which serves to identify a document which is used in a telecommunications session. For example and without limitation, a document identifier can be the title of an article which has been emailed as an attachment by one user to another or the file name of slide presentation shown during a web conference. Those skilled in the art will recognize, after reading this disclosure, how to devise alternative embodiments of the present invention in which the document identifier identifies any type of document, such as, for example, and without limitation, text files, video files, audio files, database files, executable files, and others.

At task 230, the characteristic of the telecommunications session is recorded. In accordance with the illustrative embodiment of the present invention, the characteristic is recorded in a communications history log. The communications history log is a database that relates the characteristic of the telecommunications session with an identifier. In accordance with the illustrative embodiment of the present invention, the identifier is the legal name of user 110-2, but it will be clear to those skilled in the art, after reading this disclosure, how to make and use alternative embodiments of the present invention in which the identifier is any other identifier, such as, for example, and without limitation, a telephone number, a session initiation protocol (SIP) uniform resource identifier (URI), instant messaging (IM) identifier, email address, Internet Protocol (IP) address, legal name of a far-end party, etc. Furthermore, it will be clear to those skilled in the art, after reading this disclosure, how to make and use alternative embodiments of the present invention in which the communications history log relates the telecommunications session characteristic with other telecommunications session characteristics, such as, for example, and without limitation the medium of the telecommunications session (e.g. voice, video, text, etc.), time of the telecommunications session, date, etc.

Although, in accordance with the illustrative embodiment of the present invention, the communications history log is a database, it will be clear to those skilled in the art, after reading this disclosure, how to make and use alternative embodiments of the present invention in which the communications history log is any device capable of storing information, such as, for example, and without limitation, a text file, a binary file, and others. In accordance with the illustrative embodiment of the present invention, the communications history log is stored on terminal 110-1, but it will be clear to those skilled in the art, after reading this disclosure, how to make and use alternative embodiments of the present invention in which the communications history log is stored on an external server.

At task 240, terminal 110 utilizes the recorded characteristic. Task 240 is further described in the discussions with respect to FIG. 7 and FIG. 8.

Figure 3:
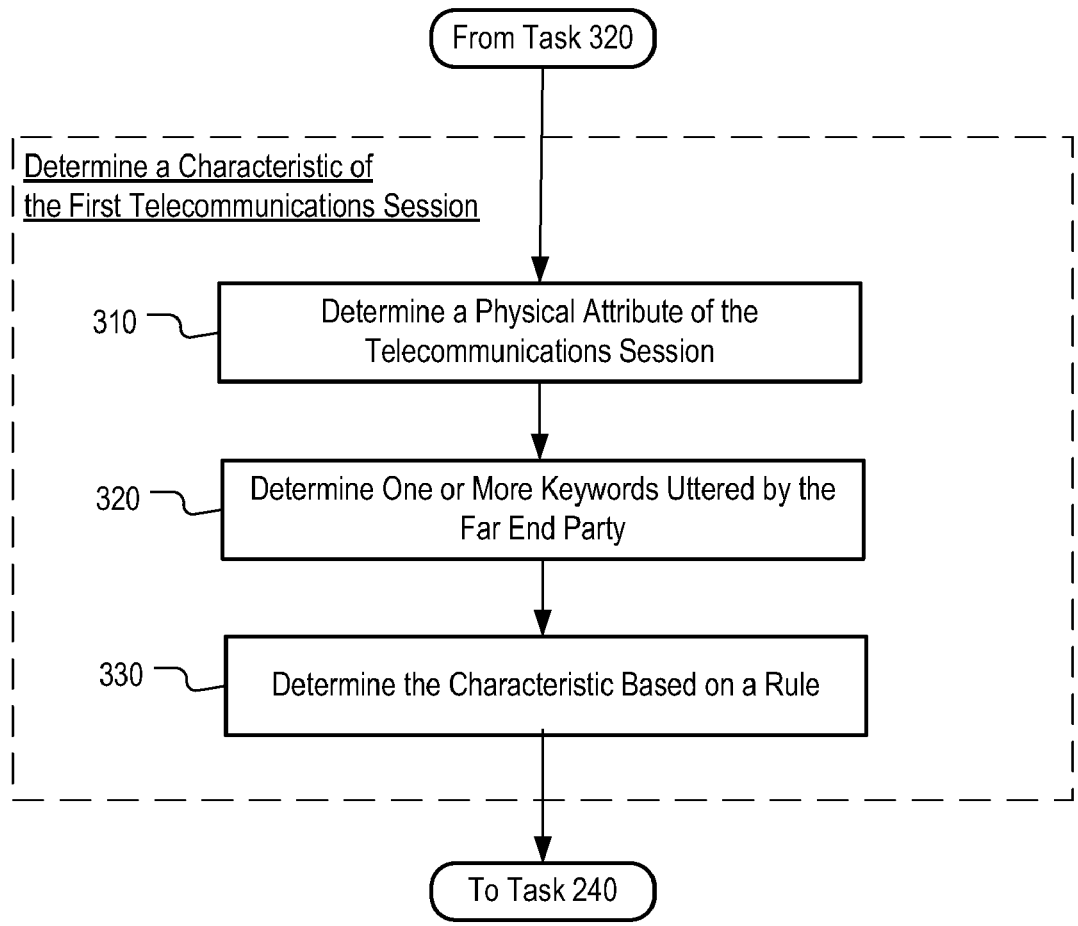
FIG. 3 depicts a flowchart of the salient subtasks associated with the execution of task 220.

FIG. 3 depicts a flowchart of the salient tasks associated with the execution of task 220 as performed in one illustrative embodiment of the present invention. It will be clear to those skilled in the art, after reading this disclosure, how to perform the tasks associated with FIG. 3 in a different order than represented or to perform one or more of the tasks concurrently. Furthermore, it will be clear to those skilled in the art, after reading this disclosure, how to make and use alternative embodiments of the present invention that omit one or more of the tasks.

At task 310, terminal 110-1 detects one or more physical attributes of the telecommunications session. In accordance with the illustrative embodiment of the present invention, terminal 110 detects the duration of the telecommunications session. However, it will be clear to those skilled in the art, after reading this disclosure, how to make and use alternative embodiments of the present invention in which the detected attribute is any physical attribute, such as, for example, and without limitation, information about the strength of the signal received by user 101-1, the geographic location of the telecommunications terminal used by the far-end party, an information whether the far-end party answered an invitation to participate in the telecommunications session (e.g. whether user 110-2 answered the telephone call, etc.), the loss of signal from the far-end party (e.g. the dropping of incoming packages by network 120, etc. ), the level (loudness) of voice of the far-end party, geographic location, and others.

At task 320, terminal 110-1 uses automatic speech recognition to transcribe the speech of user 101-2 into text. In accordance with the illustrative embodiment of the present invention, only the speech of one far-end party is transcribed, but it will be clear to those skilled in the art, after reading this disclosure, how to make and use alternative embodiments of the present invention in which the speech of another telecommunications session participant is converted into text, such as, for example, and without limitation, another far-end party, a near-end party, and others.

At task 330, terminal 110-1 determines one or more telecommunications session characteristics based on a rule. The terminal executes an algorithm which relies on a set of rules for identifying characteristics of the telecommunications session that concern the availability of user 101-2 to participate in the telecommunications session. In accordance with the illustrative embodiment of the present invention, terminal 101 determines whether the user was available based on the duration of telecommunications session. Specifically, the user 101-2 is deemed unavailable if the telecommunications session lasts for less than five seconds. The rationale for this rule is that if a telephone call lasts less than five seconds, it is highly likely that the far-end party answered the phone merely to say that he or she is not available at the moment. In accordance with the illustrative embodiment of the present invention, terminal 110-1 determines availability, but it will be clear to those skilled in the art, after reading this disclosure, how to make and use alternative embodiments of the present invention in which terminal 110-1 determines other telecommunications session characteristics, such as, for example, and without limitation, disposition, topic of discussion, information concerning relevant documents, and others.

Furthermore, it will be clear to those skilled in the art, after reading this disclosure, how to make and use alternative embodiments of the present invention in which the rule is based on multiple telecommunications session characteristics, such as, for example, and without limitation, a rule that finds the far-end party unavailable if the duration of the telecommunications session is less than a predetermined number and if and only if the quality of the connection is not poor. The rule in this example is based on an observation that if a telephone call lasted for five seconds only and the connection was bad, it is likely that the reason for the early termination of the phone call was a disruption in the connection and not the user hanging up because he or she was busy. In any event, it will be clear to those skilled in the art, after reading this disclosure, how to make and use alternative embodiments of the present invention that employ a variety of rules and heuristics.

Furthermore, it will be clear to those skilled in the art, after reading this disclosure, how to make and use alternative embodiments of the present invention in which the rule for determination of availability depends on the presence of specific keywords and phrases in the speech transcript that is produced at task 320, such as, for example, and without limitation, "busy", "Let me call you later", and others. For an instance, those skilled in the art will recognize, after reading this disclosure, how to define a rule in which the far-end party is deemed unavailable, if the word "busy" is pronounced by the far-end party within a predetermined time interval following the establishment of the telecommunications session. In any event, it will be clear to those skilled in the art how to select appropriate keywords and phrases as the basis for rules for determining user availability. Furthermore, it will be clear to those skilled in the art, after reading this disclosure, how to make and use alternative embodiments of the present invention in which the predetermined time period varies (e.g. one minute, five minutes, thirty minutes, one hour, two hours, etc.)

Although, in the illustrative embodiment of the present invention, the whole transcript is analyzed for the presence of keywords and phrases, it will be clear to those skilled in the art, after reading this disclosure, how to devise alternative embodiments of the present invention in which only specific parts of the transcript are processed. In predictable telecommunications sessions, such as those conducted between customers and customer service call centers, customer representatives often read scripted questions from the screen of a computer.

The predictability of these types of telecommunications can be used by identifying which questions in the script are most relevant with respect to determining specific telecommunications session characteristics. For example, one can determine that the question "Are you happy with our service?" is very relevant with respect to a customer's disposition. Therefore, those skilled in the art will recognize, after reading this disclosure, how to make and use alternative embodiments of the present invention in which only an excerpt of the telecommunications session transcript which contains the answer to the relevant question is processed. In this way, terminal 110 avoids considering keywords that were said outside of the context of the customer's disposition.

Because it is known ahead of time what questions are in the script used by the customer service representatives, in the alternative embodiment of the present invention, terminal 110-1 searches the transcript of the telecommunications session for strings which resemble the questions in the script. More specifically, in this illustrative embodiment, terminal 110-1 searches the telecommunications session transcript for a sting that resembles the question "Are you happy with our service?". After that, terminal 110-1 searches the text transcript for a string which resembles the question following the relevant question in the script. By locating the string resembling the relevant question, terminal 110-1 determines where, approximately, in the transcript, the answer to the relevant question begins. And similarly, by locating the string resembling the question following the relevant question, terminal 110-1 determines where, approximately, in the transcript, the answer to the relevant question ends.

After terminal 110-1 determines the approximate beginning and end of the answer to the relevant question, the answer is searched for keywords and phrases that are indicative of the far-end party's disposition, such as, for example, "happy," "dissatisfied", etc. It will be clear to those skilled in the art how to identify questions and keywords that that are relevant with respect to the user's disposition. Furthermore it will be clear to those skilled in the art, after reading this disclosure, how to make and use alternative embodiments of the present invention in which other telecommunications sessions characteristics are determined by locating and processing only the answers to specific questions in a speech transcript.

Figure 4:
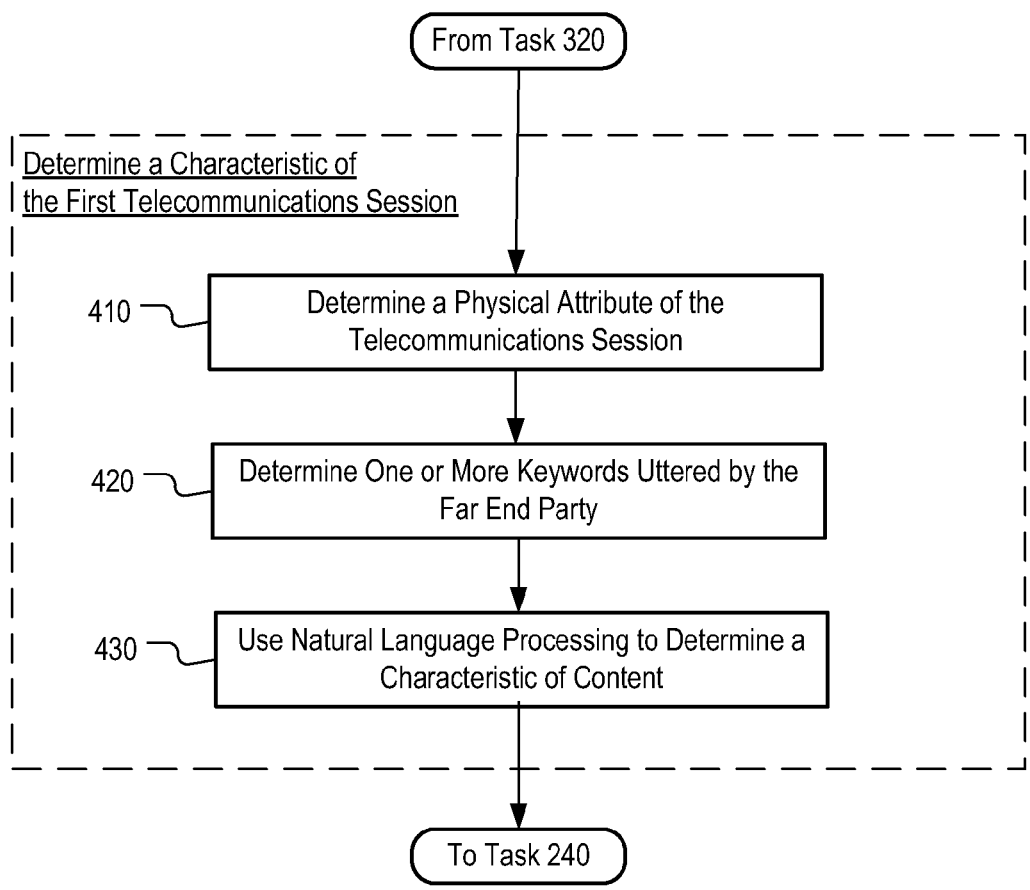
FIG. 4 depicts a flowchart of the salient subtasks associated with the execution of task 220.

FIG. 4 depicts a flowchart of the salient tasks associated with the execution of task 220 as performed in another illustrative embodiment of the present invention. It will be clear to those skilled in the art, after reading this disclosure, how to perform the tasks associated with FIG. 4 in a different order than represented or to perform one or more of the tasks concurrently. Furthermore, it will be clear to those skilled in the art, after reading this disclosure, how to make and use alternative embodiments of the present invention that omit one or more of the tasks.

At task 410, terminal 110-1 detects one or more physical attributes of the telecommunications session. In accordance with the illustrative embodiment of the present invention, terminal 110 detects the duration of the telecommunications session. However, it will be clear to those skilled in the art, after reading this disclosure, how to make and use alternative embodiments of the present invention in which the detected attribute is any physical attribute, such as, for example, and without limitation, information about the strength of the signal received by user 101-1, the geographic location of the telecommunications terminal used by the far-end party, an information whether the far-end party answered an invitation to participate in the telecommunications session (e.g. whether user 110-2 answered the telephone call, etc.), the loss of signal from the far-end party (e.g. the dropping of incoming packages by network 120, etc. ), the level (loudness) of voice of the far-end party, geographic location, and others.

At task 420, terminal 110-1 uses automatic speech recognition to transcribe the speech of user 101-2 into text. In accordance with the illustrative embodiment of the present invention, only the speech of one far-end party is transcribed, but it will be clear to those skilled in the art, after reading this disclosure, how to make and use alternative embodiments of the present invention in which the speech of multiple far-end parties is transcribed. Furthermore, it will be clear to those skilled in the art, after reading this disclosure, how to make and use alternative embodiments of the present invention in which the speech of a near-end party is converted into text.

At task 430, terminal 110-1 classifies the telecommunications session as having one or more characteristics. Terminal 110-1 uses a classification model to classify the utterances of user 101-2 as attributing one or more characteristics to the telecommunications session. In accordance with the illustrative embodiment of the present invention, the classification model is based on latent semantic indexing and it involves the creation of a query vector that is derived from keywords present in the transcript of user 101-2's speech. Then, the query vector is compared to a set of document vectors which are derived from keywords that are known to indicate that the telecommunications session has a particular characteristic. It will be clear to those skilled in the art how to create, train, and use a latent semantic indexing model for the identifications of characteristics of telecommunications sessions based on keywords and phrases.

Furthermore, it will be clear to those skilled in the art how to select keywords that correspond to the telecommunications session having certain characteristics. And still furthermore, it would be clear to those skilled in the art, after reading this disclosure, how to make and use alternative embodiments of the present invention in which the latent semantic indexing model for the identification of telecommunications characteristics is based on one or more physical attributes. Although the illustrative embodiment of the present invention uses latent semantic indexing, it will be clear to those skilled in the art, after reading this disclosure, how to make and use alternative embodiments of the present invention that use other natural language processing methods, such as rule based models, probabilistic models (e.g. Markov models, etc.) and others.

Those skilled in the art will readily recognize, after reading this disclosure, that alternative embodiments of the present invention can be devised in which software is used to analyze the far-end party's speech patterns (e.g. speed of talking, timbre, sound frequencies, crackles in the voice of the far-end party, etc.) and a record in the communication history log an indication of one or more telecommunications session characteristics that are indicated by the detected speech patterns. In accordance with the alternative embodiments of the present invention, auditory detection software is used to analyze the far end party's speech pattern to determine the far-end party's disposition. However, it will be clear to those skilled in the art, after reading this disclosure in which other types of software are used, such as, video processing software, image processing software, etc. It will be clear to those skilled in the art, how to make and use auditory mood detection software that is capable of discerning the disposition of a far-end party based on sound signals received from the far-end party.

Figure 5:
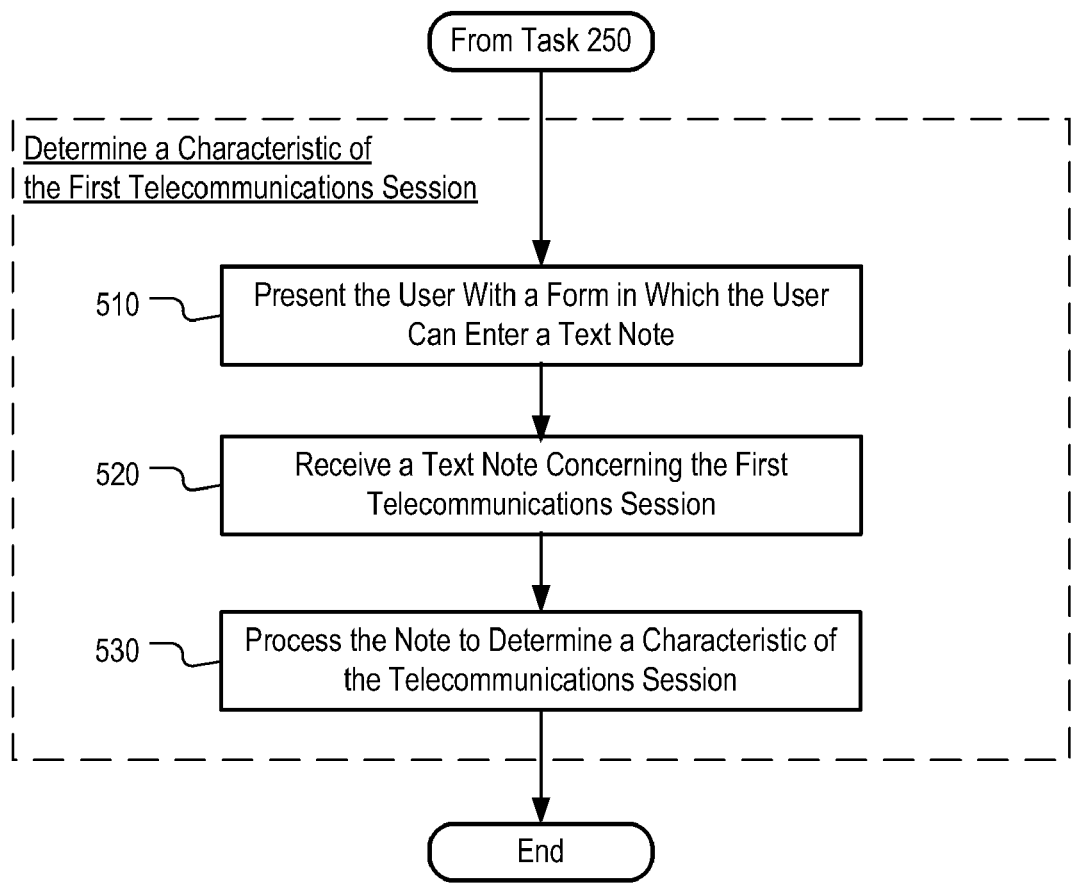
FIG. 5 depicts a flowchart of the salient subtasks associated with the execution of task 220.

FIG. 5 depicts a flowchart of the salient tasks associated with the execution of task 220 as performed in another illustrative embodiment of the present invention. It will be clear to those skilled in the art, after reading this disclosure, how to perform the tasks associated with FIG. 5 in a different order than represented or to perform one or more of the tasks concurrently. Furthermore, it will be clear to those skilled in the art, after reading this disclosure, how to make and use alternative embodiments of the present invention that omit one or more of the tasks.

At task 510, terminal 110 displays an electronic form which allows the user to enter a text note. In accordance with the illustrative embodiment of the present invention, the electronic form is a Hypertext Markup Language (HTML) document comprising a text input box, but it will be clear to those skilled in the art, after reading this disclosure, how to make and use alternative embodiments of the present invention in which terminal 110-1 utilizes other means for receiving text input from user 101-1, such as, for example, and without limitation, portable document format (PDF) forms or a graphical user interface (GUI) window which comprises a text input component.

At task 520, terminal 110-1 receives a text input from user 101-1 concerning a characteristic of the telecommunications session. In accordance with the illustrative embodiment of the present invention, the input is text, but it will be clear to those skilled in the art, after reading this disclosure, how to make and use alternative embodiments of the present invention in which the input is entered as a voice note by using the microphone of terminal 110-1 and subsequently transcribed into text.

At task 530, terminal 110-1 processes the user input to infer one or more telecommunications session characteristics. In accordance with the illustrative embodiment of the present invention, terminal 110-1 searches the user input for keywords and phrases that are indicative of telecommunications session characteristics. For example, and without limitation, the presence of the keyword "friendly" in the user input may be deemed to indicate that the far-end party had a friendly disposition. Similarly, the present of the phrase "he is in a conference" may be deemed to indicate that the far-end party is not available. It will be clear to those skilled in the art how to determine which keywords and phrases are indicative of specific telecommunications session characteristics. Furthermore, it will be clear to those skilled in the art, after reading this disclosure, how to make and use alternative embodiments of the present invention in which natural language processing techniques, such as latent semantic indexing (LSI) are used to infer one or more telecommunications session characteristics from the user input.

FIG. 6 depicts a diagram for the salient components of the illustrative embodiment of the present invention. The illustrative embodiment of the present invention comprises user interface 610.

User interface 610 is a graphical user interface for the input of information about telecommunications session characteristics into terminal 110-1. In accordance with the illustrative embodiment of the present invention, user interface 610 presents the user with bullet lists identifying different telecommunications session characteristics. Although, in the illustrative embodiment of the present invention, user interface 610 features bullet lists, it will be clear to those skilled in the art, after reading this disclosure, how to make and use alternative embodiments of the present invention in which user interface 610 utilizes other types of interface components for the selection of predetermined input (i.e. components that allow selecting an information subset from a predetermined information set), such as, for example, and without limitation, drop down lists, check boxes, etc.

Figure 7:
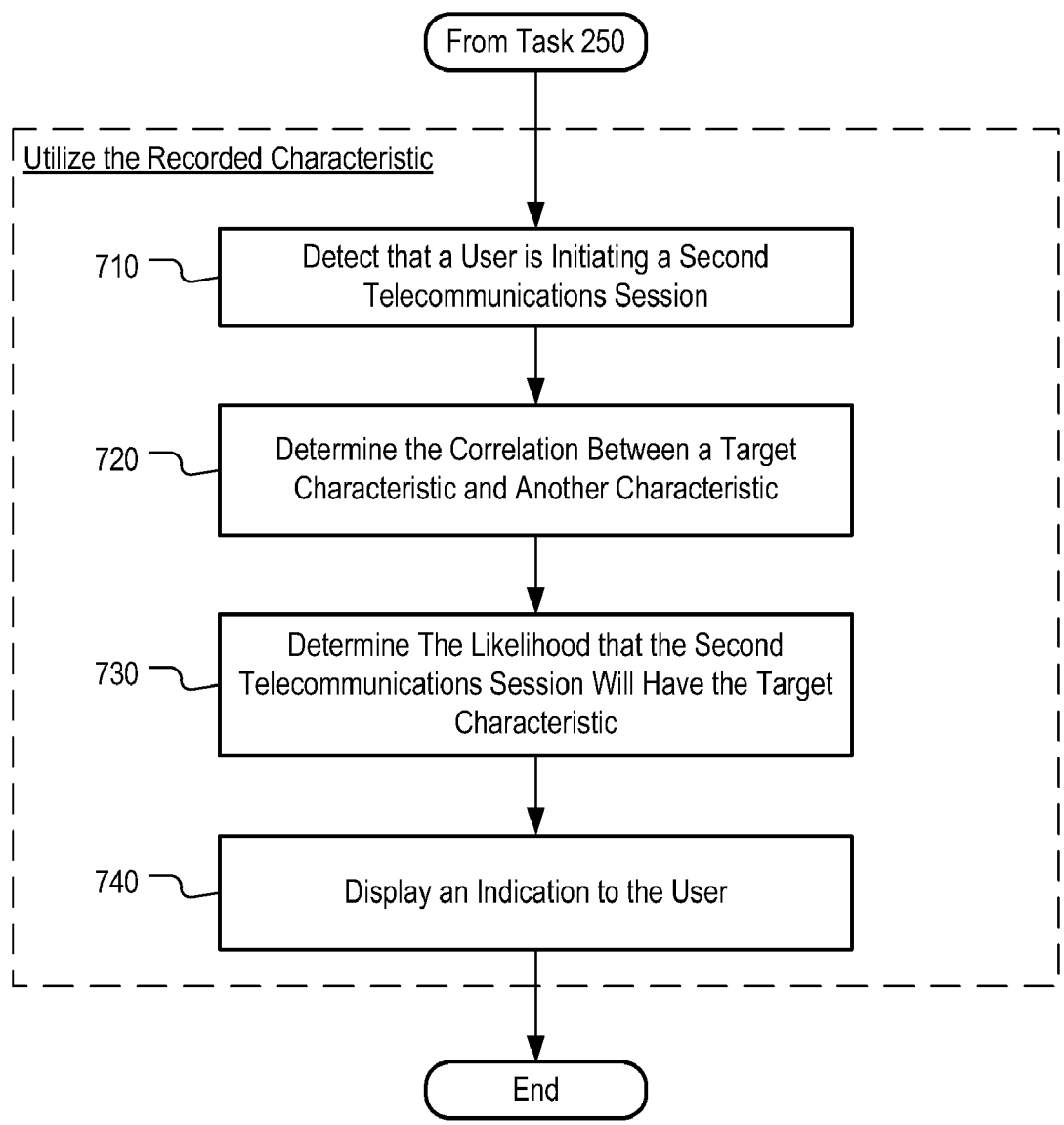
FIG. 7 depicts a flowchart of the salient tasks associated with the execution of task 240.

FIG. 7 depicts a flowchart of the salient tasks associated with the execution of task 240. It will be clear to those skilled in the art, after reading this disclosure, how to perform the tasks associated with FIG. 7 in a different order than represented or to perform one or more of the tasks concurrently. Furthermore, it will be clear to those skilled in the art, after reading this disclosure, how to make and use alternative embodiments of the present invention that omit one or more of the tasks.

At task 710, terminal 110-1 detects that user 101-1 is initiating a second telecommunications session. In accordance with the illustrative embodiment of the present invention, terminal 110-1 detects that user 101-1 has dialed a telephone number, but those skilled in the art will recognize, after reading this disclosure, how to make and use alternative embodiments of the present invention in which terminal 110-1 detects that user 101-1 is initiating a telecommunications session based on alternative events, such as, for example, and without limitation, the pressing of a button, the typing of an email, the opening of a contacts list, the opening of an address book, etc. In accordance with the illustrative embodiment of the present invention, the second telecommunications session is a telephone call, but it will be clear to those skilled in the art, after reading this disclosure, how to make and use alternative embodiments of the present invention in which the second telecommunications session is of any type (e.g. email, online chat session, short message service (SMS), video call, teleconference, etc.).

At task 720, terminal 110-1 determines the correlation between the past occurrences of a target telecommunications session characteristic and another telecommunications session characteristic. In the illustrative embodiment of the present invention, terminal 110-1 determines the correlation between the availability of the far-end party in past telephone calls and the time at which the telephone calls were initiated.

To do so terminal 110-1 searches the communication history log to determine the frequency at which the far-end party was available to answer telephone calls that were initiated at approximately the same time of the day as the time at which the second telecommunications session is initiated.

In accordance with the illustrative embodiment of the present invention, the target characteristic is availability, but it will be clear to those skilled in the art, after reading this disclosure, how to make and use alternative embodiments of the present invention in which the target characteristic is any other telecommunications session characteristic (e.g. physical attributes, document identifier, topic, disposition, etc.). Furthermore, it will be clear to those skilled in the art, after reading this disclosure, how to make and use alternative embodiments of the present invention in which the correlation between any pair of the telecommunications session characteristics is measured.

At task 730, telecommunications terminal 110-1 determines the likelihood that the second telecommunications session will have the target telecommunications session characteristic. The likelihood is determined on the basis of the correlation between the user's past availability to answer telephone calls and the time at which the past telephone calls were initiated. More specifically, if the communications history log indicates that the far-end party was unavailable in 90% of the telecommunications sessions that were initiated in a certain time period (e.g. 1 p.m.-2 p.m.), terminal 110-1 will arrive at the conclusion that the user is likely to be unavailable to answer telephone calls at around 1:30 p.m.

Furthermore, it will be clear to those skilled in the art, after reading this disclosure, how to make and use alternative embodiments of the present invention in which the target characteristic is a document identifier. In the alternative embodiments of the present invention, terminal 110-1 determines what documents (or information) user 101-1 needs to have at his or her disposal prior to beginning the second telecommunications session. For example, and without limitation, if the communications history log indicates that in 80% of the telecommunications between the user and the user's cable television company, the user divulged his or her account number, the terminal will determine that user 101-1 is likely to be asked for his account number again.

At task 740, terminal 110 displays the prediction to user 101-1. In accordance with the illustrative embodiment of the present invention, terminal 101-1 displays the prediction graphically in the form of text and/or images on a display screen, but it will be clear to those skilled in the art, after reading this disclosure, how to make and use alternative embodiments of the present invention in which the prediction is displayed in another way such as, for example, and without limitation, playing a voice message at the terminal, etc. Furthermore, those skilled in the art will recognize, after reading this disclosure, how to make and use alternative embodiments in the present invention in which multiple predictions are displayed (e.g. predictions about availability, user disposition, etc.).

And still furthermore, it will be clear to those skilled in the art, after reading this disclosure, how to make and use alternative embodiments of the present invention in which an advice identifying a more suitable time to conduct the second telecommunications session or a more suitable communications medium (e.g. email, short message service, etc.). The suitable time is determined by executing one or more of the tasks described in the discussion with respect to FIG. 8.

Figure 8:
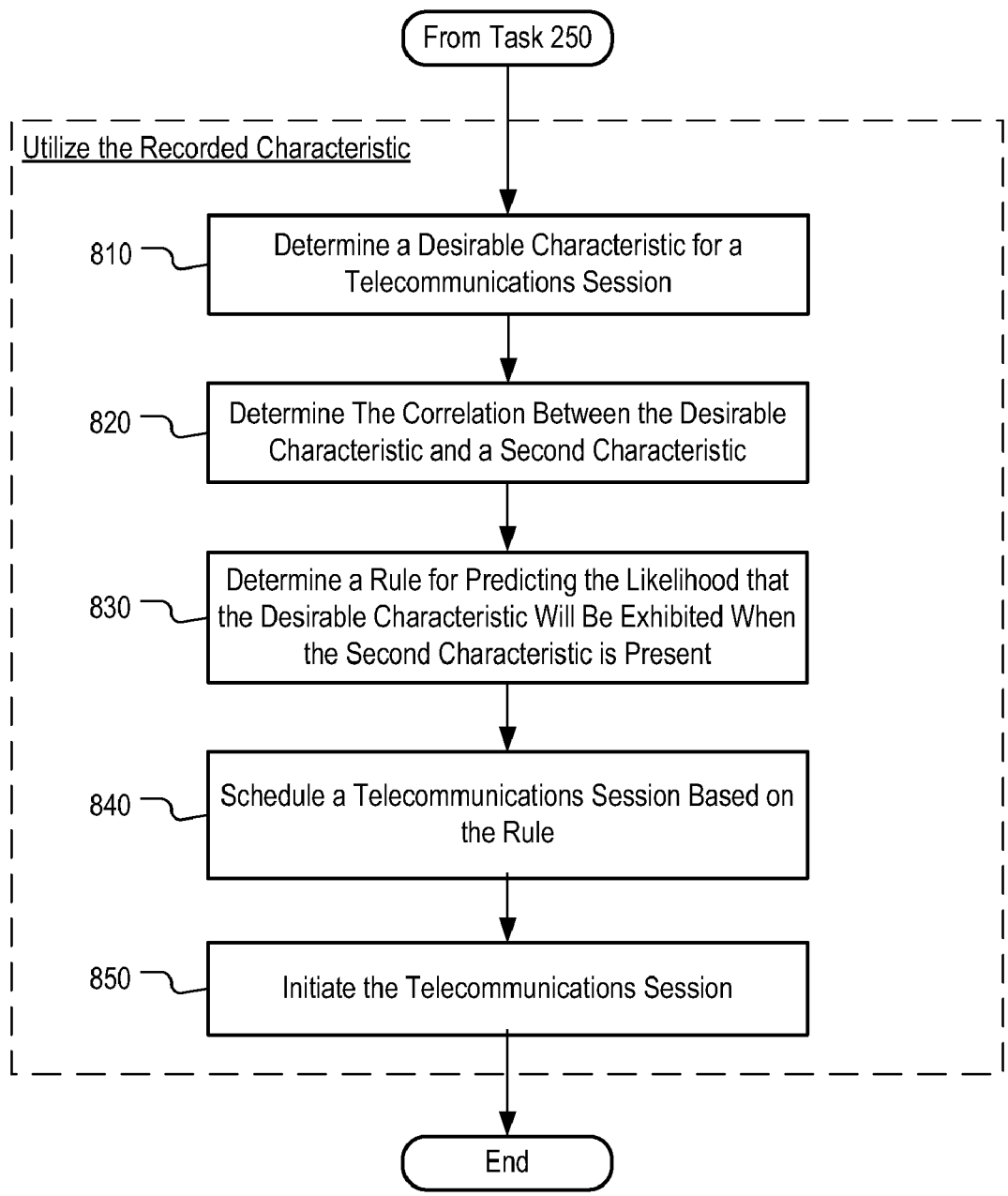
FIG. 8 depicts a flowchart of the salient tasks associated with the execution of task 240.

FIG. 8 depicts a flowchart of the salient tasks associated with the execution of task 240 as performed by another illustrative embodiment of the present invention. It will be clear to those skilled in the art, after reading this disclosure, how to perform the tasks associated with FIG. 8 in a different order than represented or to perform one or more of the tasks concurrently. Furthermore, it will be clear to those skilled in the art, after reading this disclosure, how to make and use alternative embodiments of the present invention that omit one or more of the tasks.

At task 810 terminal 110-1 determines a desirable characteristic for a telecommunications session with a far-end party. In accordance with the illustrative embodiment of the present invention, the desirable characteristic is availability. However, it will be clear to those skilled in the art, after reading this disclosure, how to make and use alternative embodiments of the present invention in which the desirable characteristic is any other telecommunications session characteristic, such as, for example, and without limitation, physical attributes, document identifiers, availability, disposition, topic, etc. Furthermore, in accordance with the illustrative embodiment of the present invention, the determination is based on user input indicating the characteristic, but it will be clear to those skilled in the art, after reading this disclosure, how to make and use alternative embodiments of the present invention in which the characteristic is determined ahead of time by the manufacturer of telecommunications terminal 110-1.

At task 820, terminal 110-1 statistically processes the data available in the communications history log in order to determine whether a correlation exists between the desirable telecommunications session characteristic and a second characteristic. However, it will be clear to those skilled in the art, after reading this disclosure, how to make and use alternative embodiments of the present invention in which terminal 110-1 measures the correlation between the desirable characteristic and multiple telecommunications session characteristics.

In accordance with the illustrative embodiment of the present invention, terminal 110-1 determines the correlation between the availability of the far-end party and the time of the day. However, it will be clear to those skilled in the art, after reading this disclosure, how to make and use alternative embodiments of the present invention in which terminal 110-1 determines the correlation between any pair of telecommunications session characteristics, such as, for example, and without limitation, far-end party disposition and topic of a telecommunications session, far-end party disposition and telecommunications session duration, availability and telecommunications session medium, and so forth.

More specifically, in the illustrative embodiment of the present invention, terminal 110-1 determines the correlation between availability of a far-end party in past telecommunications session and the time at which the past telecommunications sessions were started. The correlation, in the illustrative embodiment, is determined by terminal 110-1 searching the communications history log and counting how often a far-end party is available during different one-hour intervals of the day. For example, terminal 110 searches the communications history log for all telephone calls that were initiated with the far-end party between 8 a.m. and 9 a.m. and determines in how many of those telephone calls the far-end party was available. Then, the terminal searches the communications history log for all telephone calls that were initiated to the far end party between 9 a.m. and 10 a.m., and, again, determines in how many of those telephone calls the far-end party was available.

In this way, based on the far-end party's past history, terminal 110-1 determines the past availability of the far-party during the different periods of the day. Although, the periods analyzed are hourly periods, it will be clear to those skilled in the art, after reading this disclosure, how to make and use alternative embodiments of the present invention in which the periods have a duration of any length (e.g. 10 minutes, 20 minutes, 2 hours, 5 hours, 12 hours, 24 hours, 2 days, 7 days, 30 days, 5 months, etc.).

Furthermore, it will be clear to those skilled in the art, after reading this disclosure, how to make and use alternative embodiments of the present invention in which terminal 110-1 determines the relationship between any desired telecommunications session characteristic and another telecommunications characteristic. For example, in one alternative embodiment of the present invention, terminal 110-1 searches the communications history log to determine at what times of the day a far-end party most often exhibited a favorable disposition. Similarly to the illustrative embodiment of the present invention, terminal 110-1 searches the communication history log and determines whether the far-end party appears to have a certain disposition during specific times of the day.

In a second alternative embodiment of the present invention, terminal 110-1 determines the correlation between the availability of a far-end party and the telecommunications session medium. Similarly to the illustrative embodiment of the present invention, terminal 110-1 searches the communication history log and determines whether the far-end party appears available more often when contacted via short message service (SMS) than he or she is available when called over the phone. Specifically, terminal 110-1 searches the communications history of the log for all telecommunications sessions that were initiated to the far-end party, and determines in how many of the short message service (SMS) telecommunications sessions, the far-end party was available. Also, terminal 110-1 determines in how many of the telephone calls initiated to the far-end party, the far-end party was available.

In a third alternative embodiment of the present invention, terminal 110-1 determines correlation between the disposition of a far-end party in past telecommunications session and a topic characteristic for those sessions that is recorded in the communications history log. For example, and without limitation, in the third alternative embodiment of the present invention, terminal 110-1 might find in the communications history log that the far-end party has a friendly disposition when the near-end party divulged that he or she went to the same university as the far-end party. Similarly, terminal 110-1 might find in the communications history log that the far-end party was unfriendly in telecommunications sessions in which the topic concerned the far end party's political views.

It should be noted that in accordance with the illustrative embodiment of the present invention, the correlation between the desired characteristic and the second characteristic is determined by searching the communications history log and counting how many times the desirable characteristic was exhibited in telecommunications sessions in which the second characteristic was present. However, it will be clear to those skilled in the art, after reading this disclosure, how to make and use alternative embodiments of the present invention in which statistical techniques are used in the processing of the data from the communications history log. For example, and without limitation, those skilled in the art will recognize, after reading this disclosure, how to devise alternative embodiments of the present invention in which the relevance of items of data in the communications history log is weighted according to a criterion. In any event, it will be clear to those skilled in the art how to select the appropriate statistical techniques for processing the communications history log.

At task 830, terminal 110-1 determines a rule which predicts whether the desired telecommunications session characteristic will be exhibited when the second telecommunications session characteristic is present. In accordance with the illustrative embodiment of the present invention, the rule is based on the correlation determined at task 820. Specifically, for example, and without limitation, the rule is that the far-end party is likely to be available if called between 9 a.m. and 10 a.m, unavailable between 10 a.m. and 11 a.m., and again available between 12 p.m. and 1 p.m.

Those skilled in the art will readily recognize, after reading this disclosure, how to make and use alternative embodiments of the present invention in which the rule relates any two telecommunications session characteristics. For example, in one alternative embodiment of the present invention, terminal 110-1 determines that a far-end party is most likely to be available if contacted via short message service (SMS), rather than telephone. Similarly, in another alternative embodiment of the present invention, the rule postulates that the far-end party is likely to have a favorable disposition if the near-end party divulges that he or she went to the same university as the far-end party. In any event, it will be clear to those skilled in the art, after reading this disclosure, how to device a variety of rules based on a correlation determined at task 820.

At task 840, terminal 110-1, in a well known fashion, schedules a telecommunications session based on the rule determined at task 840. The rule determined at task 830 is used in the scheduling process to maximize the likelihood that the desired telecommunications session characteristic will be exhibited by the scheduled telecommunications session. In accordance with the illustrative embodiment of the present invention, terminal 110-1 schedules a telephone call at 9:30 a.m. because the rule determined at task 830 provides that the far-end party is likely to be available at 9:30. It will be clear to those skilled in the art, after reading this disclosure, how to make and use alternative embodiments of the present invention in which other aspects of the scheduled telecommunications are set on the basis of the rule formulated at task 830, such as, for example, and without limitation, communications medium for the scheduled telecommunications (e.g. voice, text, video, etc.), communications channel (e.g. cell phone, Skype™, short message service, email, etc.), day in the week, etc. In other words, those skilled in the art will readily recognize, after reading this disclosure, how to make and use alternative embodiments of the present invention in which and any other of the physical attributes of the scheduled telecommunications session that are capable of being selected ahead of time (e.g. one can select the medium for a scheduled telecommunications session ahead of time, but cannot necessarily select duration, etc.) is set on the basis of the rule determined at task 830.

Furthermore, it will be clear to those skilled in the art, after reading this disclosure, how to make and use alternative embodiments of the present invention in which a note is placed in the scheduling bookmark that is set by terminal 110-1 at task 840. For example, and without limitation, the note can be in the form of an advice, or reminder, such as "mention that you went to the same university as the far-end party" or "do not talk about politics," and so forth.

At task 850, terminal 110-1, in a well-known fashion, initiates the scheduled telecommunications session.

Figure 9:
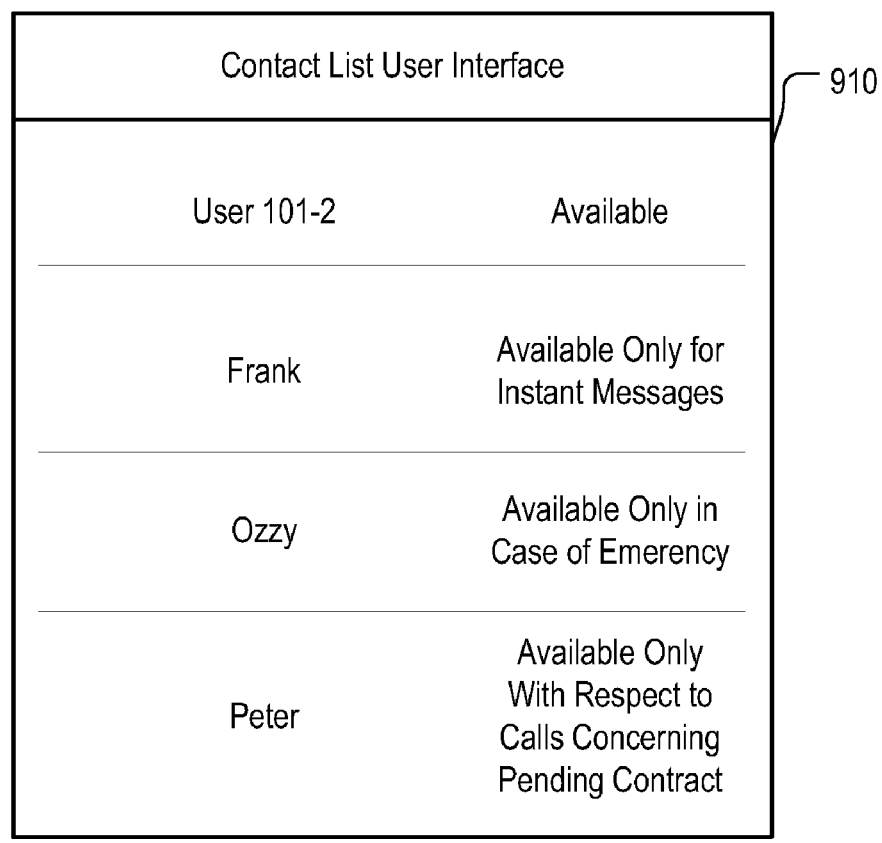
FIG. 9 depicts a schematic diagram of the salient components of the illustrative embodiment of the present invention.

FIG. 9 depicts the salient components of the illustrative embodiment of the present invention. The illustrative embodiment comprises contacts list 910.

Contact list 910 is a graphical user interface (GUI) component displayed by terminal 110-1. In particular, contact list 910 is a list which identifies the names of one or more users together with a prospective telecommunications session characteristic for each user. The prospective telecommunications session characteristic serves to inform user 101-1 about a characteristic which a telecommunications session will have if the user were to initiate the telecommunications session in the present time instant. The prospective telecommunications session characteristic is determined by executing one or more of the tasks described with respect to the discussion of FIG. 7 and FIG. 8.

In accordance with the illustrative embodiment of the present invention, the prospective telecommunications session characteristic is availability. Thus the respective labels "available", "available only for instant messages", "available in case of emergency only", and "available only with respect to calls concerning a pending contract" indicate the availability of the different users identified in the contacts list 910 if the user of terminal 110-1 were to contact one of them at a present time instant. However, it will be clear to those skilled in the art, after reading this disclosure, in which any other telecommunications characteristic is displayed. Furthermore, it will be clear to those skilled in the art, after reading this disclosure, how to make and use alternative embodiment of the present invention in which more than one prospective telecommunications characteristic is displayed.

It is to be understood that the disclosure teaches just examples of the illustrative embodiments and that many variations of the invention can easily be devised by those skilled in the art after reading this disclosure and that the scope of the present invention is to be determined by the following claims.

What is claimed is:

1. A method comprising:
   recording information associated with a first characteristic of a first telecommunications session in a communications history log associated with a telecommunications terminal;
   recording a type of communication used for the first communications session;
   determining, via a processor, a likelihood that a second telecommunication session will have a second characteristic based at least in part on the information and the type of communication; and
   initiating the second telecommunications session with the telecommunications terminal, wherein a timing of the initiating depends on the likelihood.

2. The method of claim 1 comprising:
   displaying at the telecommunications terminal a text input form; and
   extracting the information about the first characteristic from a text note, wherein the text note is received via the text input form.

3. The method of claim 1 wherein:
   the likelihood that the second telecommunications session will have the second characteristic is further determined based at least in part on a rule about the presence of the second characteristic in the future; and
   the rule relates the second characteristic with the first characteristic.

4. The method of claim 1 wherein the likelihood that the second telecommunications session will have the second characteristic is further determined based at least in part on previous occurrences of the second characteristic.

5. The method of claim 1, further comprising:
   recognizing at least one keyword as part of communications exchanged over the course of the first telecommunications session, wherein the information associated with the first characteristic is determined based on the at least one keyword.

6. A method comprising:
   recording, via a telecommunications terminal, information associated with a first characteristic of a first telecommunications session;
   recording a type of communication used for the first communications session;
   determining a likelihood that a second telecommunications session will have a second characteristic based at least in part on the information and the type of communication;
   displaying, at the telecommunications terminal, a recommendation associated with the likelihood, wherein the displaying is performed before the second telecommunications session is established; and
   initiating the second telecommunications session with the telecommunications terminal.

7. The method of claim 6 wherein the recommendation is displayed in response to detecting the initiation of a second telecommunications session by the first user.

8. The method of claim 6, further comprising:
   displaying at the telecommunications terminal a text input form; and
   extracting the information about the first characteristic from a text note, wherein the text note is received via the text input form.

9. The method of claim 6 wherein the recommendation comprises a suggestion to the first user to invite another party to the second telecommunications session.

10. The method of claim 6 wherein the recommendation comprises an identification of a document relevant to the second telecommunications session.

11. The method of claim 6 wherein the recommendation comprises an identification of a preferred medium to be used for a subsequent telecommunications session.

12. The method of claim 6 wherein the recommendation comprises an identification of the availability of the second user at the time the second telecommunications session is initiated by the first user.

13. The method of claim 6 comprising:
   recognizing at least one keyword as part of communications exchanged over the course of the first telecommunications session, wherein the information about the first characteristic is determined based at least in part on the at least one keyword.

14. A method comprising:
   recording, via a telecommunications terminal, information about a first characteristic of a first telecommunications session;
   recording a type of communication used for the first communications session;
   determining a likelihood of a second telecommunications session having a second characteristic based at least in part on the information and the type of communication;
   initiating a second telecommunications session with the telecommunications terminal, wherein a timing of the initiating depends at least in part on the likelihood.

15. The method of claim 14 wherein the first characteristic and the second characteristic are distinct.

16. The method of claim 14 further comprising:
   displaying at the telecommunications terminal a text input form; and
   extracting the information about the first characteristic from a text note, wherein the text note is received via the text input form.

17. The method of claim 14 further comprising:
recognizing at least one keyword as part of communications exchanged over the course of the first telecommunications session, wherein the information about the first characteristic is determined based at least in part on the at least one keyword.

18. The method of claim 14 wherein the likelihood is further determined based at least in part on the occurrence of the second characteristic in the past.

19. A method comprising:
storing, in a communications history log on a telecommunications terminal, information associated with at least one previous telecommunications session conducted via a telecommunications terminal;
storing a type of communication used for the at least one telecommunications session;
generating an indication of a characteristic for a future telecommunications session based at least in part on the information and the type of communication;
displaying, at a telecommunications terminal and prior to establishing the future telecommunications session, the indication.

* * * * *